United States Patent
Albrecht et al.

(10) Patent No.: US 11,917,027 B2
(45) Date of Patent: Feb. 27, 2024

(54) METHOD AND SYSTEM FOR PROVIDING TIME-CRITICAL SERVICES

(71) Applicant: Siemens Aktiengesellschaft, Munich (DE)

(72) Inventors: Harald Albrecht, Nuremberg (DE); Stephan Höme, Schwabach (DE); Thomas Talanis, Heroldsbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/023,165

(22) PCT Filed: Jun. 30, 2021

(86) PCT No.: PCT/EP2021/068060
§ 371 (c)(1),
(2) Date: Feb. 24, 2023

(87) PCT Pub. No.: WO2022/042905
PCT Pub. Date: Mar. 3, 2022

(65) Prior Publication Data
US 2023/0247100 A1 Aug. 3, 2023

(30) Foreign Application Priority Data

Aug. 31, 2020 (EP) ..................... 20193690

(51) Int. Cl.
*H04L 67/51* (2022.01)
*H04L 49/00* (2022.01)
*H04L 67/00* (2022.01)

(52) U.S. Cl.
CPC .............. *H04L 67/51* (2022.05); *H04L 49/70* (2013.01); *H04L 67/34* (2013.01)

(58) Field of Classification Search
CPC .......... H04L 67/51; H04L 67/34; H04L 49/70
See application file for complete search history.

(56) References Cited

U.S. PATENT DOCUMENTS 10,063,458 B2 * 8/2018 Zhang ................... H04L 12/467
10,999,219 B1 * 5/2021 Athreyapurapu ... H04L 41/0806
(Continued)

FOREIGN PATENT DOCUMENTS

| DE | 10229877 | 11/2003 |
|---|---|---|
| EP | 3041199 | 7/2016 |

(Continued)

OTHER PUBLICATIONS

PCT International Search Report dated Sep. 21, 2021 based on PCT/EP2021/068060 filed Jun. 30, 2021.

*Primary Examiner* — Blake J Rubin
(74) *Attorney, Agent, or Firm* — Cozen O'Connor

(57) ABSTRACT

A system and method for providing time-critical services that are each assigned at least one server component formed by a software container which is loadable into a process control environment and which is executable at the process control environment, wherein a virtual IP stack is provided for each server component, which is connected to a virtual switch comprised by the process control environment, where each service additionally comprises a directory service component for determining services provided within the process control environment, where the directory service components are interconnected via a communication interface which is separated from the virtual switch and from the virtual IP stacks of the server components, and where an aggregator component formed via an additional software container is connected to the separated communication interface, where the aggregator component makes available, outside of the process control environment, reconciled infor- (Continued)

mation regarding the services provided via the server components.

11 Claims, 2 Drawing Sheets

(56) References Cited

U.S. PATENT DOCUMENTS

| | | | |
|---|---|---|---|
| 2009/0119664 A1 | 5/2009 | Pike et al. | |
| 2016/0212223 A1 | 7/2016 | Yang et al. | |
| 2017/0149931 A1* | 5/2017 | Lochhead | H04L 41/0896 |
| 2017/0180273 A1* | 6/2017 | Daly | H04L 67/561 |
| 2018/0157532 A1* | 6/2018 | Kumar | G06F 9/5061 |
| 2018/0198824 A1* | 7/2018 | Pulapaka | G06F 9/455 |
| 2018/0295036 A1* | 10/2018 | Krishnamurthy | H04L 43/026 |
| 2019/0075063 A1* | 3/2019 | McDonnell | H04L 49/70 |
| 2019/0140983 A1* | 5/2019 | Tu | H04L 69/22 |
| 2019/0394219 A1* | 12/2019 | Huang | H04L 43/028 |
| 2020/0328966 A1* | 10/2020 | Wang | H04L 12/4641 |
| 2022/0038544 A1* | 2/2022 | Grinstein | H04L 63/083 |
| 2022/0137605 A1 | 5/2022 | Albrecht et al. | |

FOREIGN PATENT DOCUMENTS

| | | |
|---|---|---|
| EP | 3340580 | 6/2018 |
| EP | 3715986 | 9/2020 |
| WO | 2020249345 | 12/2020 |

* cited by examiner

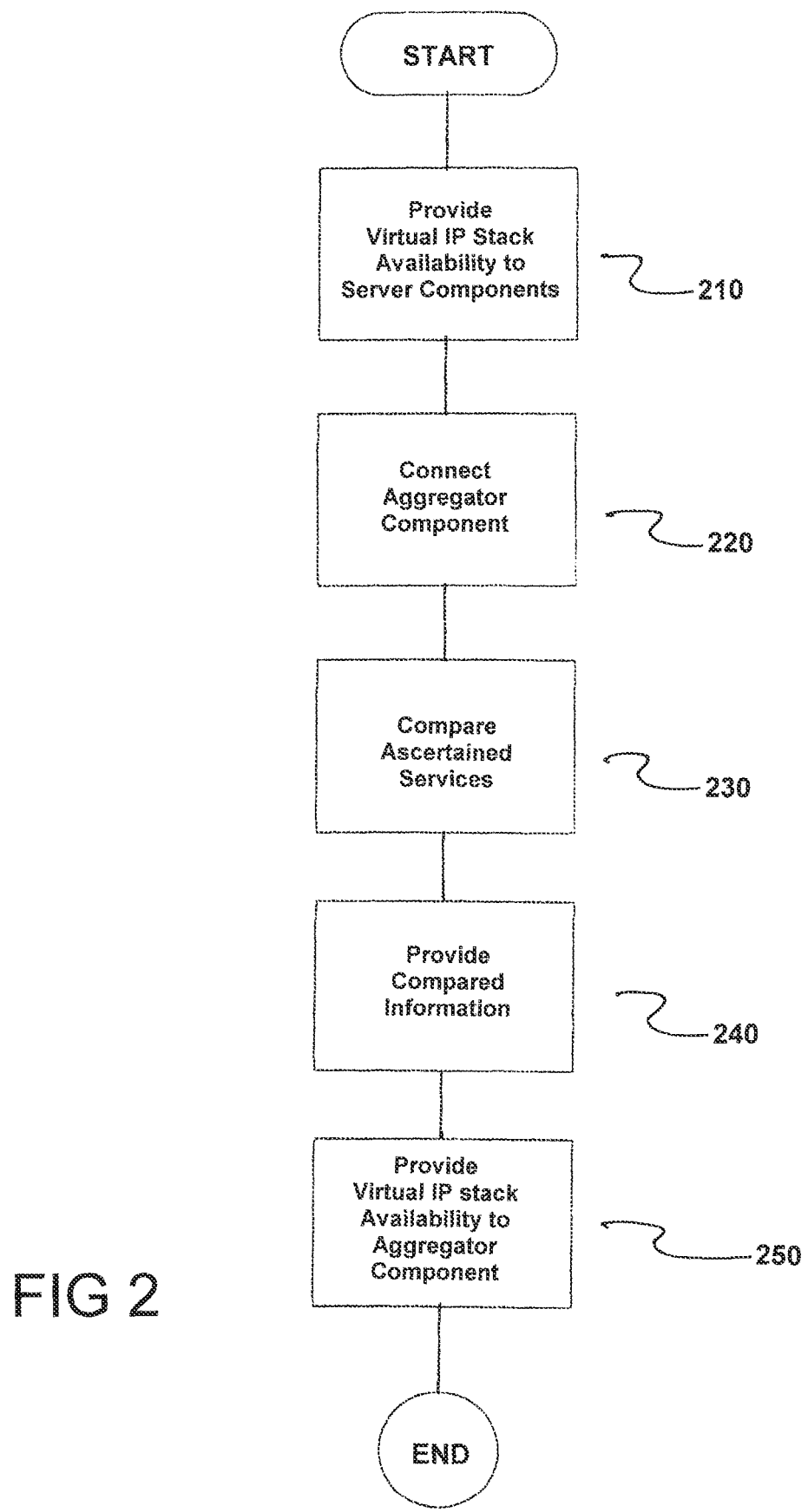

METHOD AND SYSTEM FOR PROVIDING TIME-CRITICAL SERVICES

CROSS-REFERENCE TO RELATED APPLICATIONS

This is a U.S. national stage of application No. PCT/EP2021/068060 filed 30 Jun. 2021. Priority is claimed on European Application No. 20193690.3 filed 31 Aug. 2020, the content of which is incorporated herein by reference in its entirety.

BACKGROUND OF THE INVENTION

1. Field of the Invention

The present invention relates to a method and a system for providing time-critical services, in particular in an industrial automation system.

2. Description of the Related Art

Industrial automation systems typically comprise a plurality of automation devices linked to one another via an industrial communication network and are used to control or regulate systems, machines or devices within production or process automation. Due to time-critical general conditions in industrial automation systems, real-time communication protocols such as PROFINET, PROFIBUS, Real-Time-Ethernet or Time-Sensitive Networking (TSN) are predominantly used for communication between automation devices. In particular, control services and/or applications can be automated and distributed, depending on capacity utilization, to currently available servers or virtual machines of an industrial automation system.

Interruptions of communication links between computer units of an industrial automation system or automation devices can lead to an undesirable or unnecessary repetition of a service request transmission. Furthermore, messages that are not transmitted, or not completely transmitted, can prevent an industrial automation system from transitioning into or remaining in a safe operating state.

In Ethernet-based communication networks, problems can arise if network resources for transmitting data streams or data frames with real-time requirements are demanded and compete, without special service quality requirements, with a transmission of data frames having a large payload data content. This can ultimately lead to data streams or data frames with real-time requirements not being transmitted according to a requested or required service quality.

A method for providing control applications is known from the earlier international patent application with file number PCT/EP2020/063144, where communication network addresses of sequence control components that provide control applications, as well as identifiers of the sequence control components or of server devices on which the sequence control components are executed, are requested from a monitoring device. From the requested communication network addresses and identifiers, and from designations of the control applications, a configuration control device generates configuration information for a routing device. The routing device accepts requests for using the control applications from terminal devices and routes the requests according to the configuration information to a respective sequence control component.

European patent application 19166203.0 describes a method for automatic configuration of an automation device, where a device management unit monitors whether an automation system identifier is assigned to the automation device. If the device management unit has detected such an assignment, then it asks a central management unit of a cluster whether a description object, in which the automation system identifier assigned to the automation device is already stored, exists in a cluster state database having description objects for at least one node of the cluster. If such a description object does not exist, or if such a description object exists but has been declared inactive, then the device management unit generates a description object, in which the automation identifier assigned to the automation device is stored, in the cluster state database for a node identifier assigned to the automation device.

Existing service/device discovery methods, in particular for Open Platform Communications Unified Architecture (OPC-UA), are primarily designed for ascertaining services that are made available for usage via physical or virtual hypervisor-based machines. In particular, relatively high operating and maintenance costs for hypervisor-based virtual machines are making virtualization concepts, with lower resource requirements compared to a complete system virtualization, e.g., container virtualization, increasingly attractive. This also applies to industrial automation systems.

Local discovery servers (LDS) for OPC-UA based services complying with OPC-UA specifications have been provided. However, only hosts within a broadcast domain can be discovered via each corresponding detection method. Furthermore, multi-cast communication is generally blocked within systems for container virtualization.

SUMMARY OF THE INVENTION

It is an object of the present invention to provide a device and method for providing time-critical services that enables a reliable user ascertainment of services provided via container virtualization or comparable virtualization concepts.

This and other objects and advantages are achieved in accordance with the invention by a method for providing time-critical services, where the services each comprise at least one server component formed by a software container that executes, isolated from other software containers or container groups, within a sequence control environment on a host operating system of a server device. The sequence control environment comprises a virtual switch, and the software containers each use, jointly with other software containers running on the respective server device, a kernel of the host operating system of the server device. A virtual IP stack that is connected to the virtual switch is made available for each of the server components.

For example, the sequence control environment can comprise a Docker engine that runs on a server device. Memory images for the software containers can be retrieved, for example, from a storage and provisioning system accessible for reading and writing by a plurality of users.

In accordance with the invention, the services each additionally comprise a directory service component formed by means of a separate software container to ascertain services provided within the sequence control environment. The directory service components are interconnected via a communication interface that is separated from the virtual switch and the virtual IP stacks of the server components and forms a side channel for communication between the server components and the sequence control environment.

Furthermore, an aggregator component formed via a further software container is connected in accordance with the invention to the separated communication interface and makes information regarding the services provided via the server components available outside the sequence control environment. For this purpose, a virtual IP stack that is connected to the virtual IP switch is made available for the aggregator component. The directory service components compare information about respectively ascertained services with one another and/or with the aggregator component. The aggregator component makes the compared information available outside the sequence control environment. Services or functions of an industrial automation system are preferably provided via the server components. The services can each comprise multiple similar or identical server components that are each provided by different server devices.

In particular, the present invention makes it possible to install and execute multiple applications provided via sequence control components simultaneously, without the necessity of configuration work or adaptations of the applications for a service recognition initiated by users of the applications. For providers of corresponding applications, in particular OPC-UA server functions, this yields a sharp reduction in their expenses for system integration, such that applications can be provided quickly and cost-effectively.

The directory service components are advantageously each generated whenever a server component for the respective service is first started. Furthermore, the directory service components can each be connected to one another or to a directory service client assigned to one of the aggregator components, for example, via a bidirectional communication link for inter-process communication within a data processing device, or via a separate transport layer connection. On this basis, the directory service components can compare information regarding respectively ascertained services with one another or with the directory service client. A comparison of the ascertained services between the directory service components and/or with the directory service client can be performed cyclically by means of polling or can be event-driven. In accordance with another advantageous embodiment of the present invention, the separated communication interface comprises the bidirectional communication links for inter-process communication and/or the transport layer connections.

In accordance with the above explanations, the sequence control environment is provided in accordance with the invention via a server device. The software containers can each be migrated from the server device to a different server device for execution there and/or can be executed simultaneously on other server devices. A monitoring device assigned to multiple server devices preferably captures a creation, a deletion and/or a modification of the software containers. The creation, the deletion and/or the modification of the software containers each comprise an allocation or release of resources in the respective server device. Furthermore, the monitoring device registers the services with their respective execution status. In particular, mutually dependent services can be reliably orchestrated in this manner.

The objects and advantages in accordance with the invention are also achieved by a system for providing time-critical services that performs the method in accordance with the disclosed embodiments and that comprises a sequence control environment, a virtual switch comprised by the sequence control environment and multiple server components each comprised by a service. The server components are each formed by a software container that is configured to execute, isolated from other software containers or container groups, within a sequence control environment on a host operating system of a server device and to use, jointly with other software containers executing on the server device, a kernel of the host operating system. The server components each have a virtual IP stack that is connected to the virtual switch.

Furthermore, the system in accordance with the invention comprises multiple directory service components, each additionally comprised by a service, in order to ascertain services provided via the sequence control environment. The directory service components are each formed via a separate software container. Furthermore, the directory service components are interconnected via a communication interface that is separated from the virtual switch and the virtual IP stacks of the server components and forms a side channel for communication between the server components and the sequence control environment.

In addition, an aggregator component formed via a further software container is provided in accordance with the invention, where the aggregator component is connected to the separated communication interface and is configured to make information regarding the services provided via the server components available outside the sequence control environment. The aggregator component has a virtual IP stack that is connected to the virtual IP switch. Furthermore, the directory service components are each configured to compare information regarding respectively ascertained services with one another or with the aggregator component. The aggregator component is accordingly configured to provide the compared information outside the sequence control environment.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described in more detail below for an exemplary embodiment with reference to the drawing, in which:

FIG. 2 is a flowchart of the method in accordance with the invention.

DETAILED DESCRIPTION OF THE EXEMPLARY EMBODIMENTS

Figure 1:
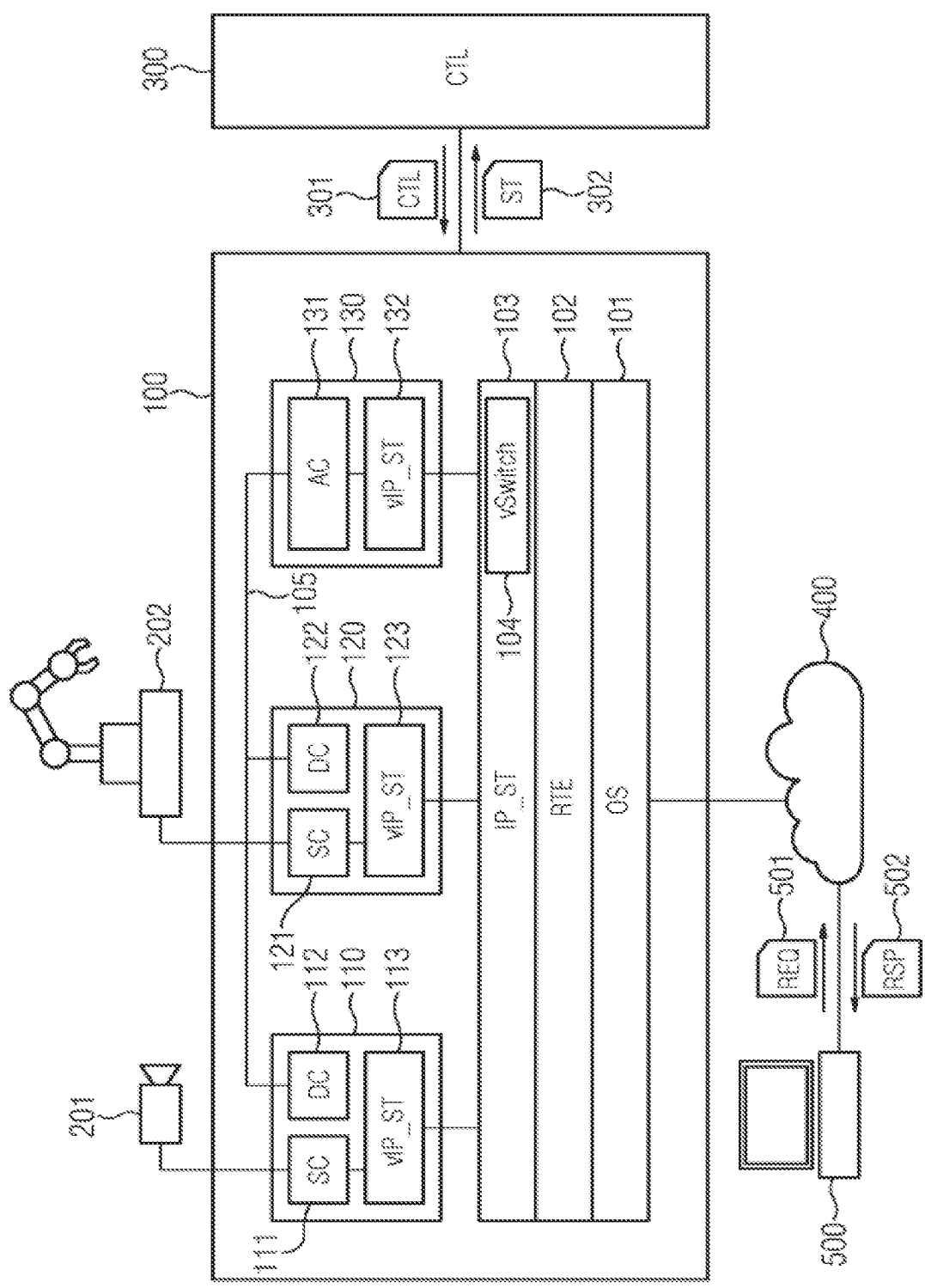
FIG. 1 shows a schematic representation of an arrangement having a server device for providing services and/or control and monitoring applications of an industrial automation system to at least one user of a terminal device via a communication network.

The arrangement shown in FIG. 1 comprises a server device 100 having multiple virtual hosts 110, 120, 130 for providing services and/or control and monitoring applications of an industrial automation system. The services and/or control and monitoring applications of the industrial automation system are examples of time-critical services. In the present exemplary embodiment, the services and/or control and monitoring applications are provided on the basis of OPC-UA. The services and/or control and monitoring applications thus comprise interface definitions that can be used for permanent access to the services and/or control and monitoring applications.

The services can each comprise multiple similar or identical control and monitoring applications that are each provided by different server devices and/or virtual hosts. A provision of multiple similar control applications on different server devices or via different virtual hosts simultaneously can be controlled via Kubernetes daemonsets by a monitoring device 200, for example, which is assigned administratively to the server devices and/or virtual hosts.

Furthermore, the arrangement shown in FIG. 1 comprises at least one terminal device 500 that is assigned to at least one user who, in the present exemplary embodiment, transmits requests 501 complying with OPC-UA for use of the services to the server device 100 via a communication network 400 and accordingly receives responses 502 and/or measured values and status messages therefrom. The communication network 400 is preferably formed as a time-sensitive network, complying in particular with Institute of Electrical and Electronics Engineers (IEEE) 802.IQ, IEEE 802.1AB, IEEE 802.1AS, IEEE 802.IBA or IEEE 802.1CB.

The virtual hosts 110, 120 preferably implement functions of control devices of an industrial automation system, for example, programmable logic controllers (PLCs), or of field devices, such as sensors or actuators. In the present exemplary embodiment, the virtual hosts 110, 120 are used to exchange control and measurement variables with machines or devices 301-302 controlled by the server device 100 and/or the virtual hosts 110, 120. In particular, the virtual hosts 110, 120 are provided for ascertaining suitable control variables from detected measurement variables.

The terminal device 500 in the present exemplary embodiment is an operating and observation station and is used for visualizing process data or measurement and control variables, which are processed and/or detected by the server device 100 and/or the virtual hosts 110, 120 or other automation devices. In particular, the terminal device 500 is used for displaying values of a control loop and for modifying control parameters or programs.

The services each comprise at least one server component 111, 121 that is formed by a software container that executes, isolated from other software containers or container groups, within a sequence control environment 102 on a host operating system 101 of the server device 100. Software containers generally each use, jointly with other software containers running on the respective server device, a kernel of the host operating system of the server device.

The sequence control environment 102 comprises a virtual switch 104. For the server components 111, 121 on the other hand, a respective virtual IP stack 113, 123 is made available, which is connected to the virtual switch 104 and is provided for processing a communication protocol stack. In the present exemplary embodiment, the virtual switch 104 is formed via an IP stack 103, which is assigned to the sequence control environment 102 and is provided for processing a communication protocol stack.

The sequence control environment 102 is provided via the server device 100 and is installed there as an application on the host operating system 101 of the server device 100. Furthermore, software containers can each be migrated from the server device 100 to a different server device for execution there and/or can be executed simultaneously on other server devices.

An isolation of the software containers and the virtual hosts 110, 120, 130, or an isolation of selected operating system means from one another, can be implemented in particular via control groups and name-spacing. Process groups can be defined via control groups to restrict available resources for selected groups. Individual processes or control groups can be isolated or hidden from other processes or control groups via namespaces. Memory images for software containers can be retrieved, for example, from a storage and provisioning system accessible for reading and writing by a plurality of users.

For ascertaining services provided within the sequence control environment 102, the services additionally each contain a directory service component 112, 122 formed via a separate software container. The directory service components 112, 122 are interconnected via a communication interface 105 that is separated from the virtual switch 104 and the virtual IP stacks 113, 123 of the server components 111, 121 and forms a side channel for communication between the server components 111, 121 and the sequence control environment 102.

An aggregator component 131 is additionally connected to the separated communication interface 105, where the aggregator component is formed via a further software container and where the aggregator component 131 makes the information regarding the services provided via the server components 111, 121 available outside the sequence control environment 102 or outside the server device 100. The directory service components 112, 122 compare information about respectively ascertained services with one another and/or with the aggregator component 131. The aggregator component 131 provides the compared information outside the sequence control environment 102 or outside the server device 100. In particular, this compared information can be retrieved by the user of the terminal device 500.

A virtual IP stack 132 that is connected to the virtual switch 104 is made available for the aggregator component 131. In the present exemplary embodiment, the virtual host 130 comprises both the aggregator component 131 and the virtual IP stack 132 thereof. In particular, the virtual host 130 is formed via the software container for the aggregator component 131 when this software container is loaded into the sequence control environment 102 and executed there.

The directory service components 112, 122 are each generated when a server component 111, 121 for the respective service is first started. In the present exemplary embodiment, the virtual hosts 110, 120 are formed via the software containers for the server components 111, 121, including the virtual IP stacks 113, 123 thereof, and via the software containers for the directory service components 112, 122 when the software containers are loaded into the sequence control environment 102 and executed there.

The directory service components 112, 122 are preferably each connected to one another or to a directory service client assigned to one of the aggregator components 131 by means of a bidirectional communication link for inter-process communication within the server device 100, or via a separate transport layer connection. On this basis, the directory service components 112, 122 can compare information regarding respectively ascertained services with one another or with the directory service client. In particular, the bidirectional communication links for inter-process communication or the transport layer connections are comprised by the communication interface 105 separated from the virtual switch 104 and the virtual IP stacks 113, 123 of the server components 111, 121.

In addition, the arrangement shown in the FIG. 1 comprises a monitoring device 300 assigned to the server device 100 within the computer cluster for example. With appropriate monitoring tasks 301, the monitoring device 300 detects a creation, a deletion or a modification of the software containers or of Kubernetes pods comprising the software containers, and registers the services and/or control and monitoring applications with their respectively fed-back execution status 302. The monitoring device 300 is preferably formed as a Kubernetes API server. In the present exemplary embodiment, the creation, the deletion and/or the modification of the software containers or pods respectively comprises, in particular, an allocation or release of resources in the respective server device.

FIG. 2 is a flowchart of the method for providing time-critical services that each comprise at least one server component 111, 121 formed by a software container which executes, isolated from other software containers or container groups, within a sequence control environment 102 on a host operating system 101 of a server device 100, where the sequence control environment comprises a virtual switch 104 and the software containers each utilize, jointly with other software containers running on the respective server device, a kernel of the host operating system of the server device.

The method comprises making available a virtual IP stack 113, 123 which is connected to the virtual switch 104 for each of server component, as indicated in step 210. In accordance with the method, the services additionally each comprise a directory service component 112, 122 formed via a separate software container to ascertain services provided within the sequence control environment, and the directory service components are interconnected via a communication interface 105 that is separated from the virtual switch and the virtual IP stacks of the server components and form a side channel for communication between the server components and the sequence control environment.

Next, an aggregator component 131 formed via a further software container is connected to the separated communication interface 105, as indicated in step 220. The aggregator component 131 and makes information regarding the services provided via the server components available outside the sequence control environment.

Next, the directory service components compare information regarding respectively ascertained services with one another and/or with the aggregator component, as indicated in step 230.

Next, the aggregator component provides the compared information outside the sequence control environment, as indicated in step 240.

Next, a virtual IP stack 132 that is connected to the virtual IP switch 104 is made available for the aggregator component 131, as indicated in step 250.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing time-critical services which each comprise at least one server component formed by a software container which executes, isolated from other software containers or container groups, within a sequence control environment on a host operating system of a server device, the sequence control environment comprising a virtual switch and the software containers each utilizing, jointly with other software containers running on the respective server device, a kernel of the host operating system of the server device, the method comprising:
   providing availability of a virtual IP stack which is connected to the virtual switch for each of server component, the services additionally each comprising a directory service component formed via a separate software container to ascertain services provided within the sequence control environment, and the directory service components being interconnected via a communication interface which is separated from the virtual switch and the virtual IP stacks of the server components and forming a side channel for communication between the server components and the sequence control environment;
   connecting an aggregator component formed via a further software container to the separated communication interface, said aggregator component making information regarding the services provided via the server components available outside the sequence control environment;
   comparing, by the directory service components, information regarding respectively ascertained services at least one of (i) with one another and (ii) with the aggregator component;
   providing, by the aggregator component, the compared information outside the sequence control environment; and
   providing availability of a virtual IP stack which is connected to the virtual IP switch for the aggregator component.

2. The method according to claim 1, wherein the directory service components are each generated whenever a server component for the respective service is first started.

3. The method according to claim 1, wherein the directory service components are at least one of (i) each interconnected to one another and (ii) each connected to a directory service client assigned to the aggregator component via one of a bidirectional communication link for inter-process communication within a data processing device and a separate transport layer connection.

4. The method according to claim 2, wherein the directory service components are at least one of (i) each interconnected to one another and (ii) each connected to a directory service client assigned to the aggregator component via one of a bidirectional communication link for inter-process communication within a data processing device and a separate transport layer connection.

5. The method according to claim 3, wherein the separated communication interface comprises at least one of (i) the bidirectional communication links for the inter-process communication and (ii) the transport layer connections.

6. The method according claim 1, wherein the sequence control environment is provided via a server device; and wherein the software containers are at least one of (i) each migratable from the server device to a different server device for execution there and (ii) each executable simultaneously on other server devices.

7. The method according to claim 6, wherein a monitoring device assigned to multiple server devices detects at least one of a creation, a deletion and a modification of the software containers and registers the services with their respective execution status; and wherein at least one of the creation, the deletion and the modification of the software containers comprises an allocation or release of each resource in the respective server device.

8. The method according to claim 1, wherein memory images for the software containers are retrievable from a storage and provisioning system accessible for at least one of reading and writing by a plurality of users.

9. The method according to claim 1, wherein at least one of services and functions of an industrial automation system are provided via the server components.

10. The method according to claim 9, wherein the services each comprise multiple similar or identical server components that are each provided by different server devices.

11. A system for providing time-critical services, comprising:
- a sequence control environment;
- a virtual switch comprised by the sequence control environment;
- a plurality of server components each comprised by a service, said plurality of server components each being formed by a software container which is configured to execute, isolated from other software containers or container groups, within the sequence control environment on a host operating system of a server device and to utilize, jointly with other software containers executing on the server device, a kernel of the host operating system, and the plurality of server components each having a virtual IP stack which is connected to the virtual switch;
- a plurality of directory service components, each additionally comprised by a service, said plurality of directory service components each being formed via a separate software container to ascertain services provided within the sequence control environment, and the plurality of directory service components being interconnected via a communication interface which is separated from the virtual switch and the virtual IP stacks of the plurality of server components and forms a side channel for communication between the plurality of server components and the sequence control environment; and
- an aggregator component formed via a further software container, said aggregator component being connected to the separated communication interface and being configured to make information regarding the services provided via the plurality of server components available outside the sequence control environment, and the aggregator component including a virtual IP stack which is connected to the virtual IP switch;
- wherein the directory service components are each configured to compare information regarding respectively ascertained services with one another or with the aggregator component; and
- wherein the aggregator component is configured to provide the compared information outside the sequence control environment.

* * * * *